United States Patent [19]
Macari et al.

[11] 4,121,677
[45] Oct. 24, 1978

[54] CLAMPING DEVICE FOR A COIL SPRING OF A WEIGHING SCALE

[75] Inventors: Leonard J. Macari, Stamford, Conn.; Frederick J. Staudinger, North Salem, N.Y.; Paul M. Kasarauskas, Stamford, Conn.

[73] Assignee: Pitney-Bowes, Inc., Stamford, Conn.

[21] Appl. No.: 859,865

[22] Filed: Dec. 12, 1977

[51] Int. Cl.$^2$ ............................ G01G 3/00; F16F 1/12
[52] U.S. Cl. ..................................... 177/225; 267/179
[58] Field of Search ...................... 177/225, 232, 233; 267/179

[56] References Cited
U.S. PATENT DOCUMENTS

| 467,496 | 1/1892 | Chatillon | 177/233 |
| 2,936,142 | 5/1960 | Sherburne | 177/225 |

FOREIGN PATENT DOCUMENTS

| 216,787 | 12/1960 | Austria | 267/179 |
| 179,819 | 12/1906 | Fed. Rep. of Germany | 177/225 |

Primary Examiner—George H. Miller, Jr.
Attorney, Agent, or Firm—Peter Vrahotes; William D. Soltow, Jr.; Albert W. Scribner

[57] ABSTRACT

A clamping or calibrator device for a coil spring of a weighing scale is described. The clamping device features a block and a pair of shims that sandwich a coil of the spring in a fixed location in the block. A first shim of the pair is contiguously disposed to an inner arcuate surface of the coil. A second shim of the pair is contiguously disposed to an outer arcuate surface of the coil. Each shim conforms to the respective arcuate surfaces of the coil. Each shim comprises a pair of lips that prevent transverse movement of the shims with respect to the block. This prevented movement insures that the coil will be properly located and fixed in position with respect to the block.

6 Claims, 6 Drawing Figures

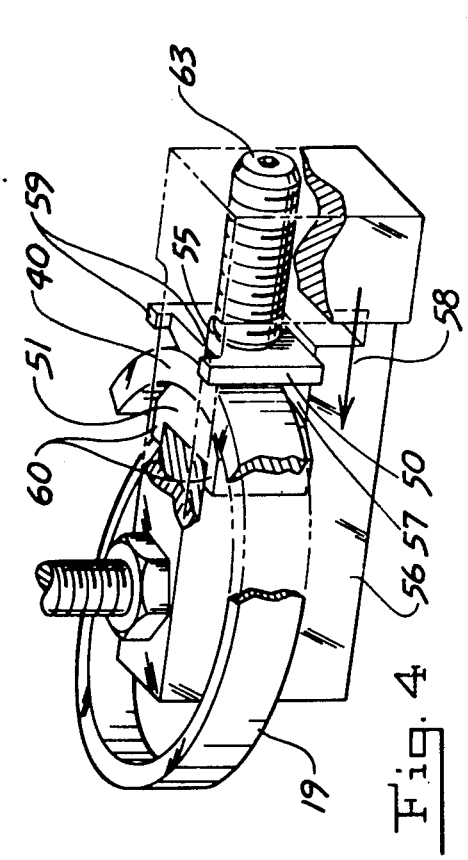
Fig. 2
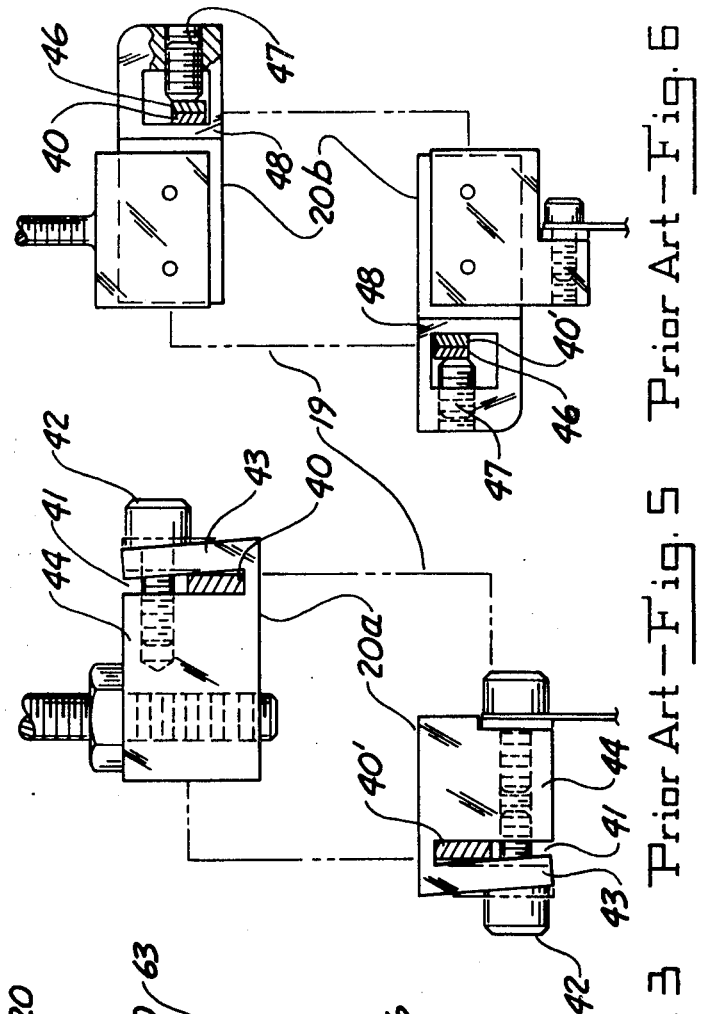
Fig. 4
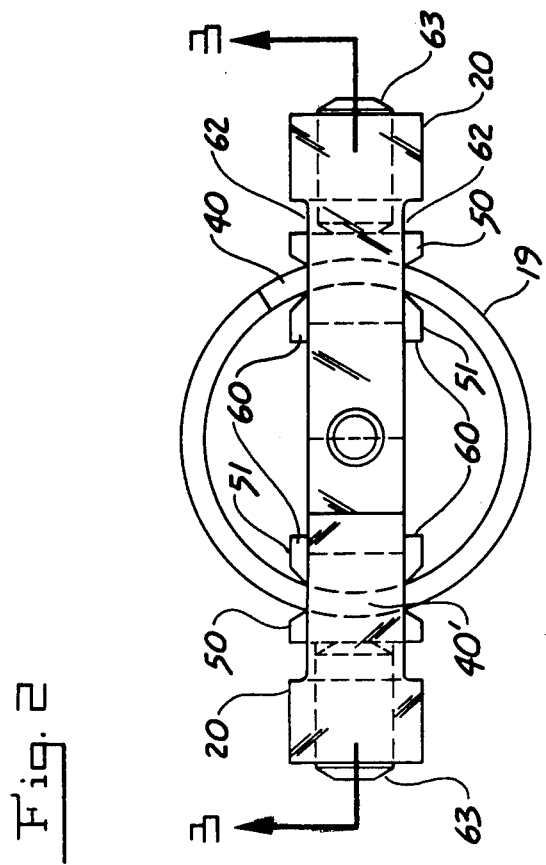
Fig. 3
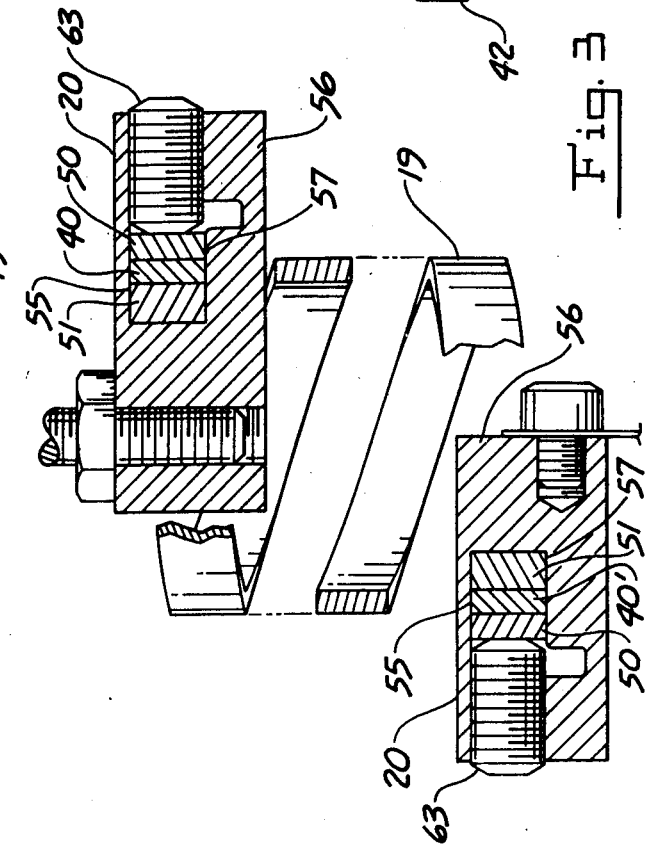
Prior Art—Fig. 5   Prior Art—Fig. 6

CLAMPING DEVICE FOR A COIL SPRING OF A WEIGHING SCALE

This invention relates to a clamping or calibrator device for a coil spring of a weighing scale, and more particularly to a clamping device that will accurately locate and fix the coil of the spring in a desired position.

BACKGROUND OF THE INVENTION

Heretofore, many clamping or calibrator devices have been designed. All have the purpose of trying to accurately lock or fix the coil spring in a desired position within the scale. For one reason or another, the prior art clamps all fail to achieve their purpose due to slippage of the coil during tightening of the clamping screws. This slippage introduces inaccuracies, which in a highly sensitive scale cannot be tolerated. The invention seeks to provide a clamping or calibrator device that does not allow slippage, and therefore, accurately locates the spring within the weighing scale.

SUMMARY OF THE INVENTION

The invention pertains to a clamping device for a coil spring of a weighing scale. The clamping device comprises a block member having an opening or window for receiving a coil of a coil spring. A first and second shim are disposed therein. Each shim is contiguous to a coil of the spring, and sandwiches the coil therebetween. Each shim conforms to an arcuate surface of the coil. The first shim conforms to an outer arcuate surface of the coil, and the second shim conforms to an inner arcuate surface of the coil. Each shim has a pair of lips that prevent transverse movement of the shims with respect to the coil of the spring. This provides for accurate placement of the coil spring with respect to the block member. A locking screw is provided for securing or otherwise fixing the location of the shims and the coil with respect to the block member. The locking screw is threaded through the block member.

It is an object of this invention to provide an improved clamping device for a coil spring of a weighing scale;

It is another object of the invention to provide a clamping device for a coil spring of a weighing scale that will accurately locate the spring within the weighing scale.

These and other objects of this invention will be better understood and will become more apparent with reference to the following detailed description taken in conjunction with the accompanying drawings, in which:

FIG. 2 is a plan view of a spring in the weighing scale of FIG. 1 having two clamping devices secured thereto at either end thereof;

FIG. 3 is a sectional view of FIG. 2 taken along lines 3—3;

FIG. 4 is a perspective view of one of the clamping devices shown in FIG. 2; and FIGS. 5 and 6 are two front views of prior art clamping devices.

DETAILED DESCRIPTION

Figure 1:
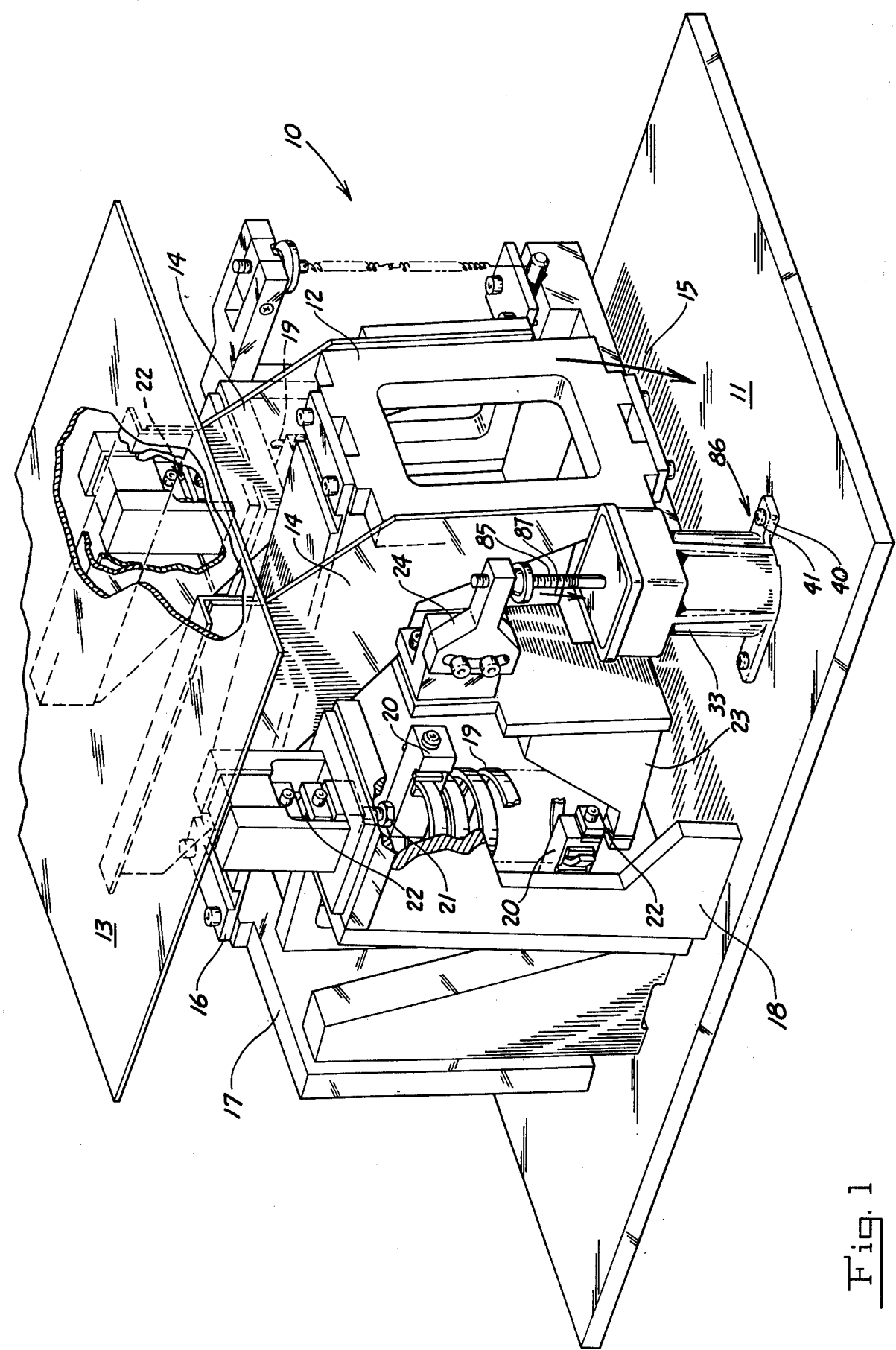
FIG. 1 is a perspective view of the invention shown in situ in a weighing scale.

Referring to FIG. 1, a weighing scale 10 containing the invention is illustrated. The scale 10 comprises a frame or base 11 for supporting a deflective load support structure 12. A weighing platform or pan 13 is connected to the load support 12 via flanges 14. The load support 12 will deflect (arrow 15) in response to a load being weighed (placed upon pan 13). The load support is fixed at one end 16 to vertical wall 17. The load support 12 deflects (arrow 15) about its other end in an arcuate motion.

The vertical frame support 18 carries a coil spring 19 via a clamping or calibrating device 20 and a suspension apparatus 21. The suspension apparatus 21 contains a flexible, torsion-free, flexure pivot 22.

Another clamp or calibrator 20 and flexure pivot 22 suspends and connects the lower end of the coil spring 19 to the deflectable load support 12 via flange 23.

There are two coil springs 19, one on each side, as shown. This duplicate spring is for the purpose of balancing the scale forces.

The flanges 23 of load support 12 has an extension member 24 that carries a piston rod 85 for a damper 86.

The invention features a new clamping or calibrator device 20 as illustrated in FIGS. 1-4. FIGS. 5 and 6 depict prior art calibrators.

Referring to FIG. 5, a pair of prior art calibrators 20a are shown. Coils 40 and 40' of spring 19 are sandwiched within slots 41 by means of tightening screws 42 into blocks 44. The tightening of the screws 42 causes extension arms 43 to angle inwardly, thus sandwiching coils 40 and 40', respectively. As can be seen, this angled movement does not clamp the coils 40 and 40' flush against the extension arm 43, so that slippage is possible between the coils and the extension arms, respectively.

The calibrators 20b of FIG. 6 employs a pair of shims 46 which are arcuately shaped to conform to the radius of coils 40 and 40', respectively. When screws 47 are tightened against the shims 46, the coils 40 and 40' are respectively sandwiched between the shims 46 and the clamping block 48. However, slippage will occur despite the arcuate shape of the shims 46. This is because the rotation of the screws 47 will create a lateral twist upon the shims 46, when the screws 47 first contact the shims 46. It therefore becomes very difficult to accurately locate the coils 40 and 40', respectively by means of this clamping technique.

The invention seeks to prevent slippage of the coils 40 and 40' by means of employing two arcuately-shaped shims 50 and 51, respectively, as illustrated in FIGS. 2-4. Shim 50 is placed before the coil, and shim 51 is placed behind the coil. The shims 50 and 51 are respectively prevented from vertical slippage, because each shim 50 and 51 is restrained by upper wall 55 of respective blocks 56, and lower wall 57 of respective blocks 56. The tolerances of the upper and lower walls 55 and 57 are such, however, that movement of the shims in a lateral direction (arrow 58, FIG. 4) is permissible. Such movement is needed to clamp the coil 40 (or 40') in place.

Side movements of shims 50 and 51 are also prevented by means of lips 59 on shim 50 and lips 60 on shim 51, respectively (See FIG. 4). These lips wrap about the side walls 62 (FIG. 2) of block 56, and prevent any side or transverse play in the shims.

Thus, as the screws 63 are tightened inwardly, the respective shims 50 and 51 tightly sandwich the respective coils 40 and 40' without any slippage. It will be seen, therefore, that even if the screws 63 create a rotary movement on the shims 50 and 51, the lips 59 and 60 respectively prevent any vertical or side slippage.

Thus it should be evident, that a superior clamping or calibrator device has been invented, which will precisely clamp and locate the coils of a scale spring.

Having thus described the invention, what is desired to be protected by Letter Patent is presented by the following appended claims.

What is claimed is:

1. A clamping device for a coil spring of a weighing scale, said clamping device comprising:
    a block member having an opening for receiving a coil of a coil spring;
    a pair of shims disposed in the opening of said block member, said pair of shims sandwiching said coil therebetween, each shim having an arcuate surface conforming to an arcuate surface of said coil, and each shim having means for preventing transverse movement of said respective shim with respect to said coil of said coil spring; and
    locking means for locking said pair of shims and said coil of a fixed location with respect to said block member.

2. The clamping device of claim 1, wherein said locking means comprises a screw threaded through said block member into said opening, whereby said screw will threadedly lock said coil and shims in a fixed position in said opening of said block member.

3. The clamping device of claim 1, wherein said means for preventing transverse movement of each shim comprises a pair of lips on each shim that engage with sides of said block member, and prevent said transverse movement of said respective shim with respect to said block member.

4. A clamping device for a coil spring of a weighing scale, said clamping device comprising:
    a block member having an opening for receiving a coil of a coil spring;
    a first shim disposed contiguously of an outer surface of said coil and a second shim disposed contiguously of an inner surface of said coil, said first and second shims conforming to, and sandwiching said coil therebetween, said first and said second shim each having means for preventing their respective transverse movement with respect to said coil of said spring; and
    locking means for locking said first and second shims and said coil in a fixed location with respect to said block member.

5. The clamping device of claim 4, wherein said locking means comprises a screw threaded through said block member into said opening, whereby said screw will threadedly lock said coil and shims in a fixed position in said opening of said block member.

6. The clamping device of claim 4, wherein said means for preventing transverse movement of each shim comprises a pair of lips on each shim that engage with sides of said block member, and prevent said transverse movement of said respective shim with respect to said block member.

* * * * *